United States Patent [19]

Jasinski et al.

[11] 4,023,603
[45] May 17, 1977

[54] TREE TOP EJECTOR

[75] Inventors: Stanley K. Jasinski; Frank A. Odorico, both of Woodstock, Canada

[73] Assignee: Eaton Yale Ltd., Woodstock, Canada

[22] Filed: Mar. 15, 1976

[21] Appl. No.: 667,062

[52] U.S. Cl. .............................. 144/2 Z; 144/3 D; 144/309 AC; 214/501

[51] Int. Cl.² ........................................ A01G 23/08

[58] Field of Search ............ 214/501, 82; 144/2 Z, 144/3 D, 34 R, 34 E, 309 AC

[56] References Cited

UNITED STATES PATENTS

| | | | |
|---|---|---|---|
| 3,140,736 | 7/1964 | Propst | 144/2 Z X |
| 3,528,468 | 9/1970 | Blonsky | 144/3 D |
| 3,833,034 | 9/1974 | Menzel et al. | 144/309 AC X |
| 3,952,783 | 4/1976 | Windsor | 144/309 AC X |

*Primary Examiner*—Othell M. Simpson
*Assistant Examiner*—W. D. Bray
*Attorney, Agent, or Firm*—Teagno & Toddy

[57] ABSTRACT

An improved harvesting and processing apparatus for trees is provided. The harvester is of the type having a gripping means disposed adjacent its forward end and a boom along its longitudinal axis. A shear and delimber associated with the apparatus are longitudinally movable relative to the boom. The shear and delimber are initially positioned adjacent each other. During delimbing, the delimber moves rearward relative to the shear. At the end of the delimbing stroke, the shear is activated to sever a bolt. A greater pressure is then applied to the delimber blades so they grip the remaining trunk during the return stroke as the delimber moves forward. At the end of the return stroke the delimber and shear have returned to their initial positions and a delimbed portion of the remaining trunk extends forward a sufficient distance to be clamped by the gripping means. The pressure on the delimbing blades is reduced to the regular delimbing pressure, and the harvester is then in position to perform a second delimbing stroke, followed by a second return stroke, and if necessary, a third set of strokes.

When the desired portion of the harvested tree has been delimbed and cut into bolts an ejector located between the shear and the delimber is activated. The ejector ejects any remaining tree trunk and limbs which may be on the harvester away from the harvester. Thus after rapidly delimbing and sectioning a tree, the harvester can be rapidly cleared for further harvesting.

7 Claims, 8 Drawing Figures

FIG. 1.

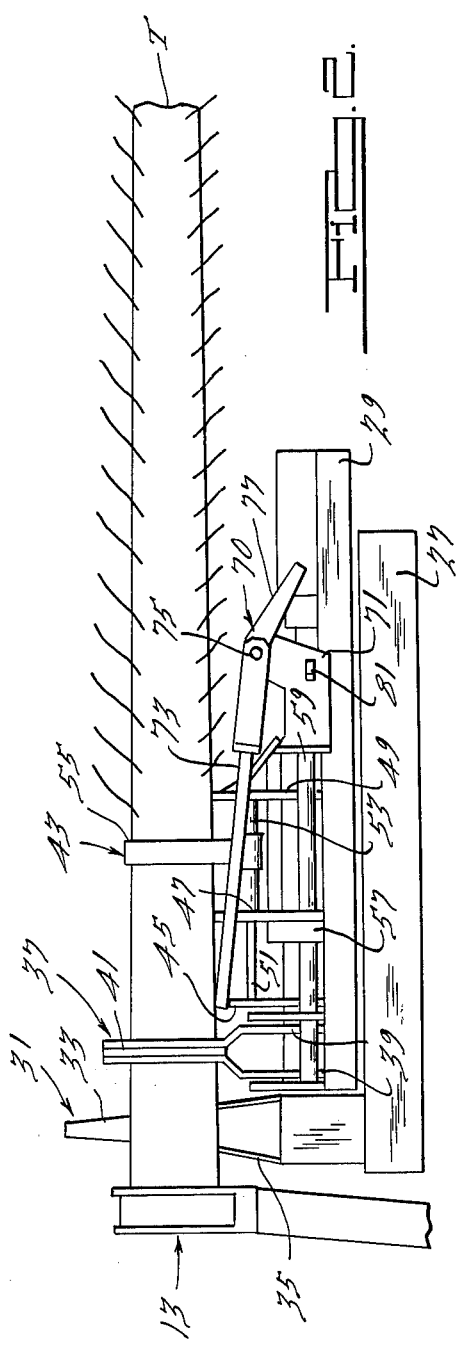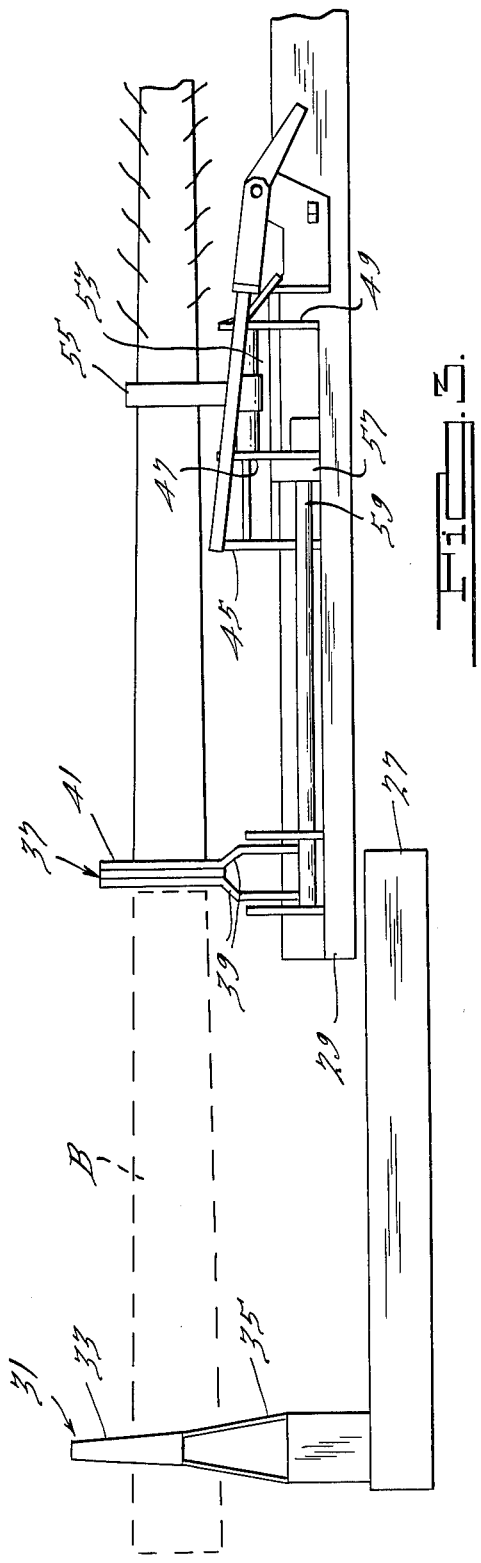

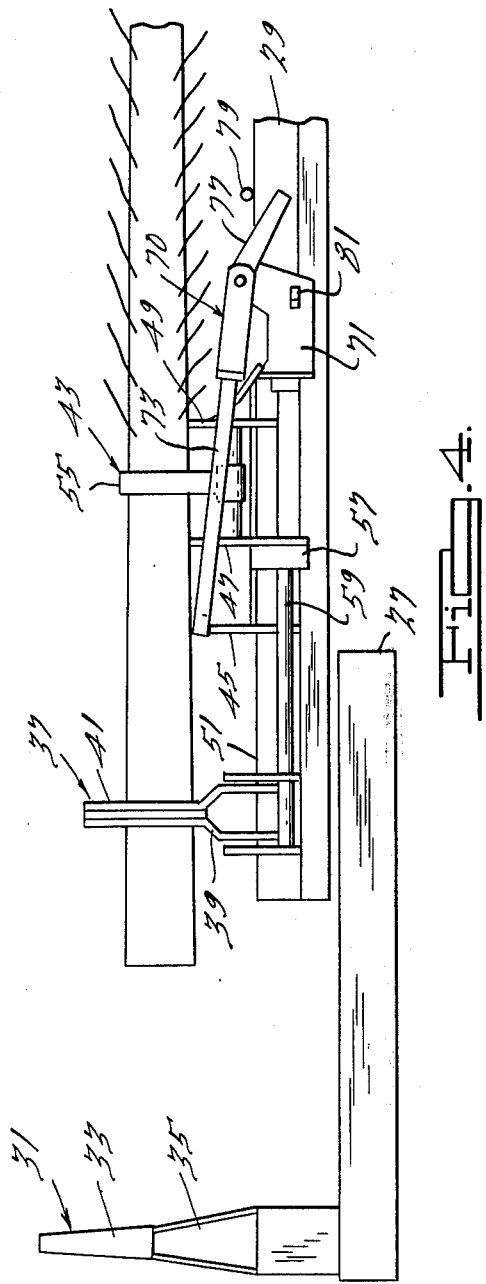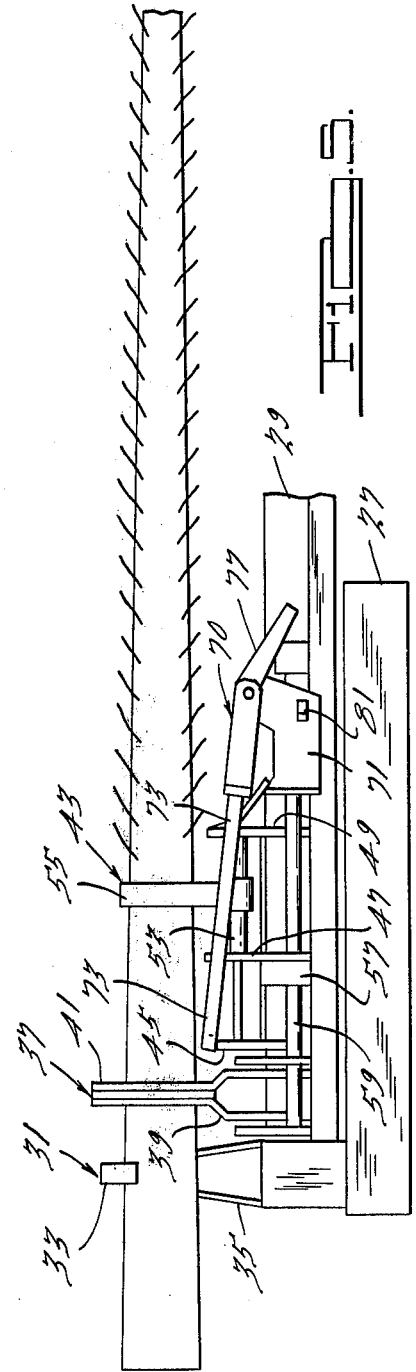

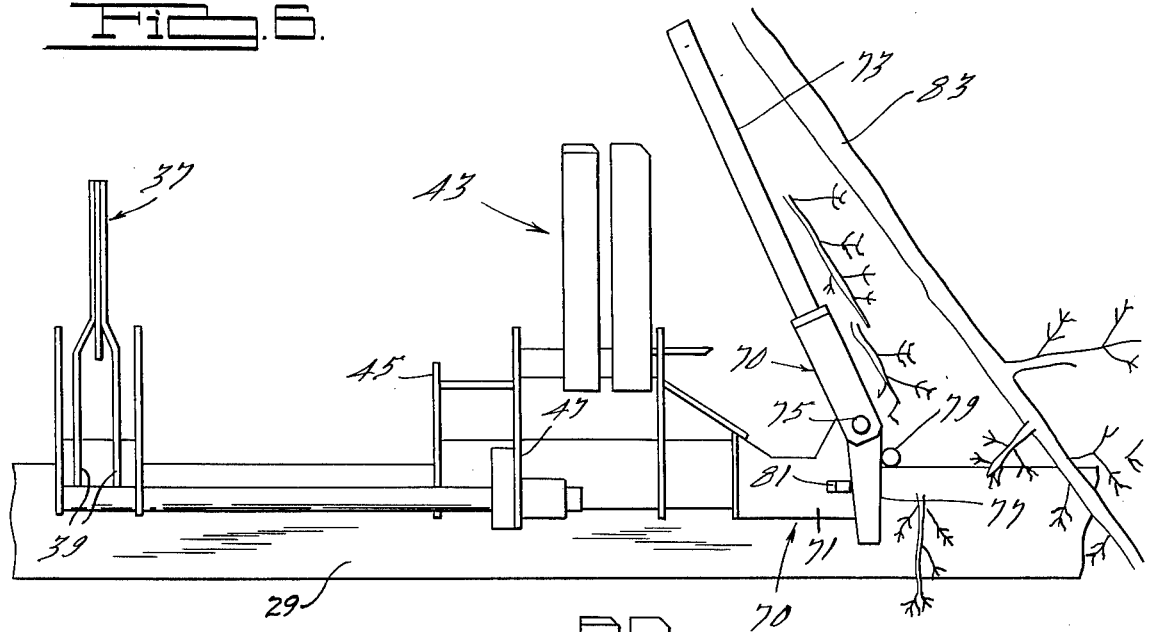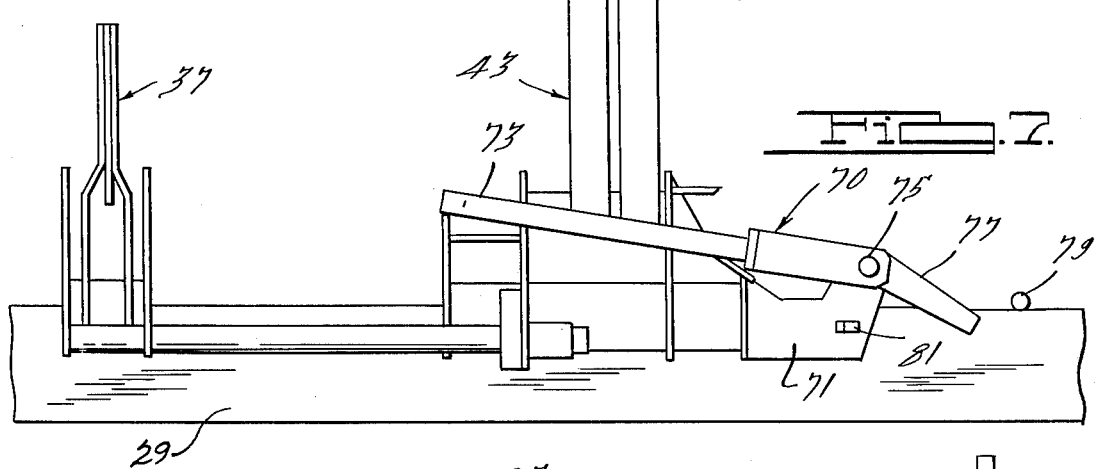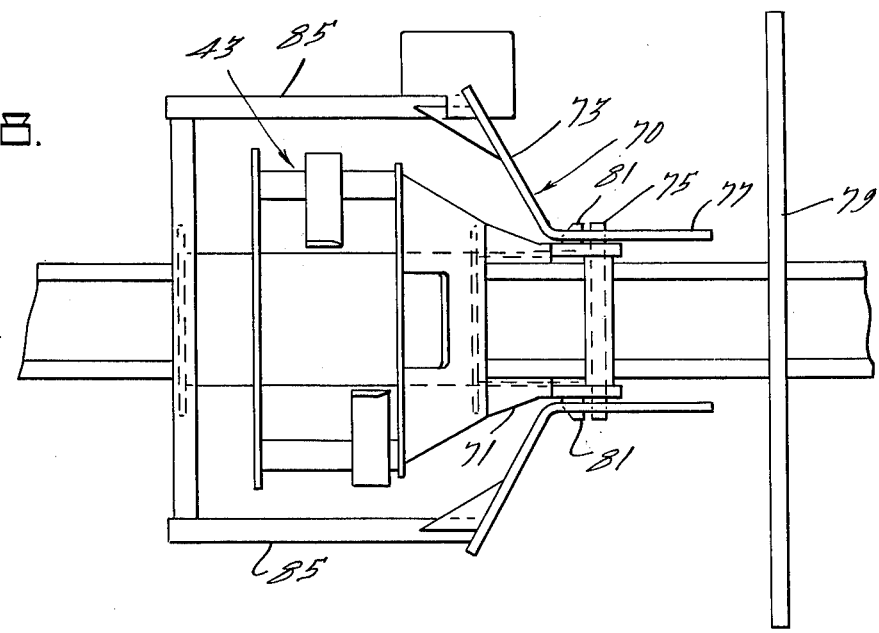

TREE TOP EJECTOR

BACKGROUND OF THE DISCLOSURE

The present invention relates to an improved method and apparatus for processing sheared trees. More particularly, the invention relates to an improved method and apparatus for processing trees which has means to eject unwanted portions of the tree from the harvester.

A typical tree harvester and processor includes a carriage having a delimber head, the carriage being movable outwardly along a boom to delimb the trunk of the sheared tree. When the carriage and delimber head reaches an outermost position, a pair of topping blades are actuated to cut off or top the outer end portion of the tree trunk. The delimbed and topped tree trunk is then deposited in a bunk.

Examples of prior art methods and apparatus for delimbing and topping trees include those illustrated in U.S. Pat. No. 3,693,679 and Canadian Pat. No. 927,718. Typically, prior art harvesters have a limitation on the height of the trees which can be processed because of the limited delimbing stroke of the harvester imposed by the overall length of the harvester. For example, one known prior art tree harvester has a 32 ft. delimbing stroke.

A tree harvester and method of processing which discloses an apparatus suitable for processing portions of a tree trunk in a sequential fashion is disclosed in copending application Ser. No. 583,734 filed on June 4, 1975 in the name of J. Gerald Smith, now U.S. Pat. No. 3,960,190.

The prior devices used to process the tree trunk sequentially provided an advance in the art and allowed the processing of various sized trees into log-length bolts. However, the present devices allow the tree limbs to fall on the harvester and pile up. Also, there is no means for removing an unused portion of the tree from the harvester.

A further problem has been a lack of support for the top portion of the tree being processed during the processing strokes.

SUMMARY OF THE INVENTION

Accordingly, it is an object of the present invention to provide an improved method and apparatus for processing sheared trees capable of ejecting sheared limbs and unused portions of the tree from the processor.

It is a further object of the present invention to provide a method and apparatus for processing sheared trees where the top portion of the tree is supported during delimbing.

These and further objects of the present invention will become apparent from the following description. Briefly, the harvester of this invention includes a boom and a means for gripping a tree adjacent its butt end, the gripping means being disposed adjacent the forward end of the boom. A processing head generally including a delimbing means and a shearing means is associated with the boom and longitudinally movable along the boom. Movement of the processing head will remove branches from the tree trunk throughout its length of travel.

After the desired portion of the tree has been delimbed, the shear on the processing head severs the processed portion from the tree top. Then an ejector mechanism, with an elevatable portion located between the shear and delimbing means, is activated. The remaining, unprocessed portion of the tree is pushed rearward off the harvester freeing the harvester for further processing. The ejector will simultaneously remove severed limbs which have accumulated on the harvester near the processing head.

In accordance with a further feature of this invention the ejector has a cam portion which protrudes beyond the rear of the harvester. The cam portion is located below the boom and in a position to support the cut tree during delimbing and processing.

BRIEF DESCRIPTION OF THE DRAWINGS

FIG. 1 is an elevational view of a tree harvester in accordance with the present invention.

FIGS. 2 – 5 are somewhat schematic illustrations of the tree harvester showing various stages of the processing cycle.

FIG. 6 is a side view showing ejector of this invention in a raised position;

FIG. 7 is a side view showing the ejector returned to its resting position; and

FIG. 8 is a plan view of the ejector mechanism.

DESCRIPTION OF THE PREFERRED EMBODIMENTS

Figure 1:
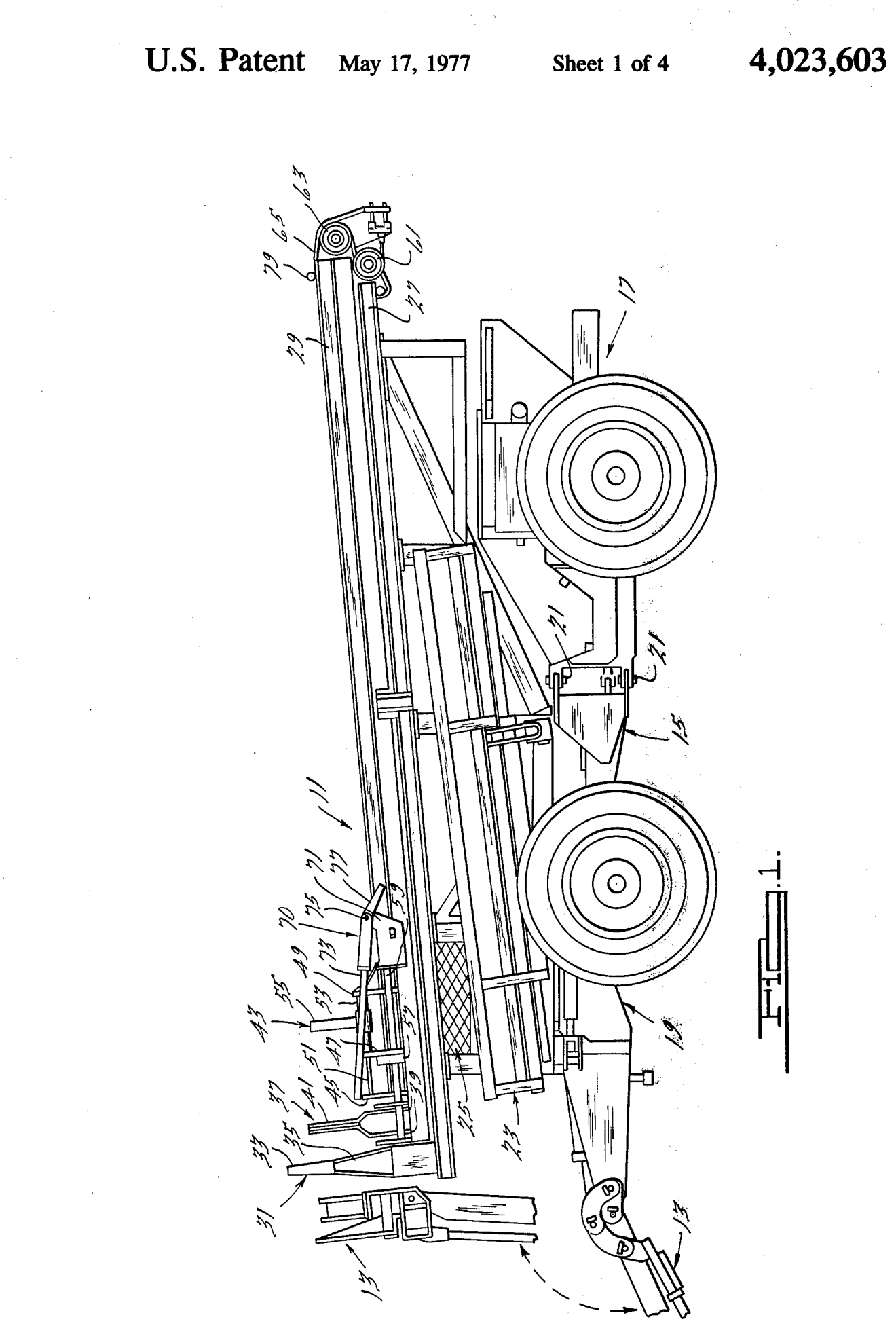

Referring to the drawings, which illustrate one embodiment of the present invention, FIG. 1 shows a tree harvesting apparatus 11 having an ejector of the present invention. The harvesting apparatus 11 includes a felling assembly 13, which is shown fragmentarily in both its lowered and raised position. In the lowered position the felling assembly 13 is operable to sever a standing tree. In the raised position the felling assembly 13 positions a severed tree trunk longitudinally on the apparatus 11 as described subsequently. The felling assembly 13 may be of a type well known in the art, and its structure is not critical in the operation of the present invention.

The harvesting apparatus 11 is preferably an articulated vehicle 15 have a trailing end portion 17 and a leading end portion 19. The end portions 17 and 19 are connected at pivots 21. After a portion of the trunk is delimbed and a bolt severed, the bolt is deposited in a bunk 23 mounted on one side of the vehicle 15. An operator's cab 25, partially hidden in FIG. 1 is mounted on the opposite side of the vehicle 15.

The articulated vehicle 15 has a lower, fixed boom 27 and an upper, sliding boom 29 which can be moved longitudinally relative to the fixed boom 27. The relative movement of the sliding boom 29 may be accomplished by any one of the means well known in the art, one example being a hydraulic cylinder and piston arrangement.

As illustrated, the harvester of FIG. 1 has a forward clamp 31 attached to the forward end of the fixed boom 27 adjacent the felling assembly 13. After the felling assembly 13 shears and positions the tree trunk, it can be used as clamping means during the initial portion of the delimbing cycle and the forward clamp 31 used during delimbing of subsequent bolts. The clamp 31 has an upper, hinged, clamping portion 33 adapted to grip the tree trunk with sufficient force to prevent longitudinal movement of the trunk during delimbing and shearing. Forward clamp 31 also includes a slanted portion 35 (i.e., slated relative to the plane of FIG. 1), which causes the severed bolt to roll into the bunk 23, when the clamp is opened.

FIG. 1 and the enlarged, schematic views of FIGS. 2 – 5 (inclusive), show a processing head including a bucking shear 37 and a delimber assembly 43. The bucking shear 37 includes front and rear support brackets 39 and a set of shear blades 41 positioned to cut on a plane perpendicular to the plane of the drawing figures. The specific details of the bucking shear 37 are not part of the present invention and the shear may be very similar to that disclosed in U.S. Pat. No. 3,894,568, "Tree Harvesting Apparatus," issued to Robert N. Windsor. The shearing apparatus description of that patent is incorporated herein by reference.

Disposed rearward of the bucking shear 37 is the delimber assembly 43 including transverse support brackets 45, 47, and 49 as well as a longitudinal support member 51 extending between the support brackets 45 and 47. Extending between the support brackets 47 and 49 is a pair of support rods 53 (only one rod being visible in each of the figures), on which is mounted a set of delimbing blades 55, adapted to move on a plane perpendicular to the plane of the figures. As with the bucking shear 37, the specific details of the delimber assembly 43 form no part of the invention. The delimber can be made in accordance with the teachings of the above-referenced Patent.

Attached to the forward face of support bracket 47 is a pair of bearing blocks 57 (only one being visible in the figures), which are preferably made of a phenolic material. A pair of connecting rods 59 are fixedly attached to the support brackets 39 of the bucking shear 37 and pass through, and are supported by, the phenolic bearing blocks 57, such that the bucking shear 37 and delimber assembly 43 are relatively movable longitudinally, in addition to each being slidable relative to the sliding boom 29.

Referring again to FIG. 1, the harvester preferably includes a pulley and rope arrangement of the type well known in the art, including pulley members 61 and 63 and a rope (or cable) 65, partially shown in FIG. 1, wrapped around the pulley members. The opposite end of the rope 65 is connected to the delimber assembly 43 so that rearward movement of the sliding boom 29 relative to the fixed boom 27 results in rearward movement of the delimber assembly 43 relative to the sliding boom 29. The harvester also includes similar pulley and rope arrangement (hidden from view in FIG. 1 by the booms 27 and 29), so that on the return stroke, forward movement of sliding boom 29 relative to fixed boom 27 causes forward movement of the delimber assembly 43 relative to the sliding boom 29. It will be understood by those skilled in the art that, within the scope of the present invention, the forward end of the rope 65 may be connected to the bucking shear 37 with the movement of the delimber assembly 43 being controlled relative thereto.

Referring specifically to FIGS. 6 – 8 the improved harvester is provided with a treetop ejector 70 attached to the delimber 43. The ejector 70 has a mount 71 with an ejector frame 73 rotatably mounted thereon by means of a pin 75. An ejector cam 77 is rigidly attached to the ejector frame 73 and extends beyond the ejector mount 71 on the side distal the delimber assembly 43. A cam follower 79 is attached to the upper surface of sliding boom 29 in a position to contact the ejector cam 77. A stop 81, attached to the side of the mount 71, is provided to limit the rotational motion of the ejector.

OPERATION

Referring again to the schematic illustration of FIGS. 2 – 5, there is shown in FIG. 2 a severed tree trunk T being gripped at its butt end by the felling assembly 13, which positions the tree trunk between the opposing shear blades 41 and the opposing delimber blades 55. The distance from the felling assembly 13 to the delimber blades 55 is such that there will not normally be any limbs forward of the delimber blades 55. If there are, however, they may be removed by the operator, utilizing the felling assembly 13 before shearing and positioning the tree trunk, so that all of the remaining limbs are accessible to the delimber blades 55. In the position shown in FIG. 2, the sliding boom 29 is in its forwardmost position, as are the bucking shear 37 and delimber assembly 43. In this initial or forwardmost position at the beginning of the cycle, the longitudinal separation between the forward clamp 31 and the delimber blades 55 is relatively small. For ease of illustration, the relative dimensions (especially longitudinal) of the various elements in FIGS. 2 – 5 are not the same as in FIG. 1, which is more representative of the preferred relative dimensions of the harvester.

In the manner described previously, the sliding boom 29 is moved rearward relative to the fixed boom 27, forcing the delimber assembly 43 rearward relative to the sliding boom 29, until it reaches the position shown in FIG. 3. This initial movement (between the positions of FIG. 2 and FIG. 3) is the "delimbing stroke," during which just sufficient actuation pressure is maintained on the delimber blades 55 to cause them to remove all of the limbs engaged by the blades 55 during the rearward movement. As the delimber assembly 43 is pulled rearward by the rope 65, the delimber assembly 43 is also moving rearward relative to the connecting rods 59. When the delimber assembly 43, and more specifically the support bracket 47 reaches the end of the rods 59, the force being exerted on the delimber assembly by the rope 65 will in turn be exerted on the bucking shear 37 by the rods 59, thus pulling the shear 37 rearward relative to the boom 29.

At the end of the delimbing stroke, in the position shown in FIG. 3, the longitudinal separation between the shear blades 41 and the delimber blades 55 has been increased from a relatively small distance to a large distance greater than the distance between the delimber and clamp 31 shown in FIG. 2. At this point, the shear blades 41 are actuated, thus severing a first bolt B, designated by the broken line, which is permitted to roll down the slanted portion 35 of the forward clamp 31 and into the bunk 23.

After the bolt B is severed, clamping pressure is applied to the delimber blades 55 and the sliding boom 29 begins its return stroke, shown in FIG. 4. During the return stroke, the delimber assembly 43 moves forward relative to the boom 29, and the remaining tree trunk moves forward with the delimber assembly 43. As the delimber assembly 43 moves forward relative to the boom 29, it also moves forward relative to the connecting rods 59, thus decreasing the longitudinal separation between the delimber blades 55 and the bucking shear 37. As a result, the butt end of the remaining tree trunk is moved between the shear blades 41 and projects forward relative thereto.

At the end of the return stroke, as is shown in FIG. 5, the delimber blades 55 are again separated longitudinally from the forward clamp 31 by the smaller distance. In this position the butt end of the remaining tree trunk projects forward a sufficient distance to permit the trunk to be gripped by the forward clamp 31. The clamp will hold the butt for a second delimbing stroke, the severing of a second bolt, and a second return stroke. At the end of such a second return stroke, the harvester will again be in the position illustrated by FIG. 5, prepared for any subsequent delimbing and return strokes that may be necessary in order to use as much of the tree trunk as is commercially feasible. Most of the operating cycle of the harvester is preferably automatic; it should be appreciated, that the last delimbing and return stroke can be controlled manually to delimb and sever only as much of the remaining trunk as is desired, while discarding the remaining tree top.

After the last delimbing stroke the remaining portion of the tree 83 is left on the end of the tree harvester 11. The delimbing assembly 43 is moved towards the end of the harvester 11, beyond the point normally used in the processing cycles, causing the ejector cam 77 to contact the stop 79. As the delimber 43 continues to move backward the stop 79 forces the cam 77 downward lifting the frame 73 towards a vertical position, as shown in FIG. 6. As the frame moves upward the tree top 83 is thrown clear of the harvester 11. Any branches which have accumulated on the delimber 43 will be pushed off the harvester by the sides 85 of the frame 73. A stop 81 on the ejector frame 71 prevents the ejector frame from being pushed past a vertical position. As the delimber 43 and ejector mount 71 are retracted towards the bucking shear assembly the frame will fall forward into place onto support bracket 45.

During the delimbing strokes the branches and limbs on the lower portion of the tree will project vertically downward. The limbs and therefore the remaining tree trunk will be supported on the ejector frame 73 ejector mount 71 and cam 77. Thus, in addition to ejecting the tree top after delimbing, the ejector will help maintain the tree trunk in the proper horizontal position during delimbing.

The invention has been described in detail sufficient to enable one of ordinary skill in the art to make and use the same. Modifications and alterations of the described embodiments will become apparent to those skilled in the art upon reading the specification. It is understood that such modifications and alterations are within the scope and spirit of this invention.

We claim:

1. An apparatus for processing a sheared tree trunk comprising:
    a. a first fixed boom member oriented generally longitudinally of said apparatus;
    b. means for gripping the tree trunk adjacent its butt end, operable to position the sheared tree lengthwise of said first boom member, the gripping means being disposed adjacent the forward end of the apparatus;
    c. a second sliding boom member mounted above said fixed boom and longitudinally movable relative to the first boom member;
    d. means for effecting relative movement between the first and second boom members;
    e. shearing means mounted on the second boom adjacent the forward end of the second boom and longitudinally movable relative thereto;
    f. delimbing means mounted on the second boom member and longitudinally movable relative to both the second boom member and the shearing means;
    g. means for effecting movement of the delimbing means rearward relative to the second boom member in response to rearward movement of the second boom member relative to the first boom member;
    h. means for effecting movement of the delimbing means forward relative to the second boom member in response to forward movement of the second boom member relative to the first boom member;
    i. means interconnecting said shearing means and the delimbing means to permit longitudinal movement of the delimbing means away from the shearing means; and
    j. an ejector attached to the second boom the ejector having an elevatable portion which rests between the delimbing means and the shearing means at a level below the tree trunk during delimbing and which can be activated to eject the remaining portion of the tree after the desired portions of the harvested tree have been delimbed and cut to length.

2. The apparatus of claim 1 where the ejector comprises:
    a frame pivotably mounted to the second boom the pivot being located on the second boom at a point between the delimber blades and the end of the boom;
    a cam surface extending from the frame;
    a stop near the end of the second boom adapted to engage the cam surface and lift the frame to a position approximately perpendicular to the longitudinal axis of the second boom.

3. The apparatus of claim 2 where the stop and the second boom extend beyond the apparatus so as to support the tree top and limbs during delimbing.

4. In an apparatus for harvesting trees including: means for gripping and severing the base of a tree, means for delimbing the desired portion of the tree, and means for severing the top of the tree from the delimbed portion the improvement comprising: an ejector located adjacent the delimbing means and having a frame which surrounds the delimbing means and having at least a portion of the frame being disposed on the side of the delimbing means opposite the gripping and shearing means; whereby said ejector will support the top of the tree during delimbing, and at the conclusion of delimbing the ejector frame can be used to clear the delimbing means of severed limbs and the remaining tree trunk.

5. In an apparatus for processing a sheared tree trunk, including an elongated boom member; a delimbing head movable along said boom member, said delimbing head including means operable to delimb said tree trunk while said delimbing head moves along said boom, and shear means operable to cut a delimbed bolt from said tree trunk; and means for holding said tree trunk stationary relative to said boom member and in position to be operated on by said delimbing head the improvement comprising: ejector means mounted on said delimbing head and operable to lift the portion of said tree trunk remaining after said bolt is cut clear of said delimbing head in response to movement of said delimbing head along said boom member.

6. The apparatus of claim 5 wherein the ejector comprises: a frame pivotably mounted to said delimbing head and being located adjacent the delimbing means; a cam surface extending from the frame; a stop near the end of said boom adapted to engage the cam surface and lift the frame to a position approximately perpendicular to the longitudinal axis of the boom.

7. The apparatus of claim 6 wherein the stop extends from said boom so as to support the tree top and limbs during delimbing.

* * * * *